United States Patent
Lee et al.

(10) Patent No.: US 11,049,677 B2
(45) Date of Patent: Jun. 29, 2021

(54) INVERSE CURRENT INJECTION-TYPE DIRECT CURRENT BLOCKING DEVICE AND METHOD USING VACUUM GAP SWITCH

(71) Applicants: KOREA ELECTRO TECHNOLOGY RESEARCH INSTITUTE, Changwon-si (KR); LSIS CO., LTD., Anyang-si (KR)

(72) Inventors: Woo Young Lee, Gimhae-si (KR); Hae Yong Park, Cheongju-si (KR); Gyeong Ho Lee, Cheongju-si (KR); Sang Hun Park, Changwon-si (KR); Chae Yoon Bae, Cheongju-si (KR); Jung Wook Sim, Sejong (KR); Hyun Jae Jang, Busan (KR)

(73) Assignees: KOREA ELECTRO TECHNOLOGY RESEARCH INSTITUTE, Changwon-si (KR); LSIS CO., LTD., Anyang-si (KR)

( * ) Notice: Subject to any disclaimer, the term of this patent is extended or adjusted under 35 U.S.C. 154(b) by 147 days.

(21) Appl. No.: 16/472,718

(22) PCT Filed: Dec. 19, 2017

(86) PCT No.: PCT/KR2017/015015
§ 371 (c)(1),
(2) Date: Jun. 21, 2019

(87) PCT Pub. No.: WO2018/117591
PCT Pub. Date: Jun. 28, 2018

(65) Prior Publication Data
US 2019/0362916 A1 Nov. 28, 2019

(30) Foreign Application Priority Data

Dec. 21, 2016 (KR) .................. 10-2016-0175793

(51) Int. Cl.
*H01H 33/00* (2006.01)
*H01H 33/59* (2006.01)
(Continued)

(52) U.S. Cl.
CPC ........ *H01H 33/596* (2013.01); *H01H 33/666* (2013.01); *H02H 3/087* (2013.01)

(58) Field of Classification Search
CPC ..... H01H 33/596; H01H 33/666; H02H 3/087
(Continued)

(56) References Cited

U.S. PATENT DOCUMENTS

2008/0061794 A1 3/2008 Pankratz
2016/0322178 A1* 11/2016 Park ..................... H01H 9/30
2017/0288388 A1* 10/2017 Horinouchi ............ H01H 33/59

FOREIGN PATENT DOCUMENTS

EP 1742241 A2 * 1/2007 ........... H01H 33/596
EP 2122647 B1 * 11/2014 ............. H01H 33/66
(Continued)

OTHER PUBLICATIONS

International Search Report for International Application No. PCT/KR2017/015015, dated May 30, 2018.

*Primary Examiner* — Thienvu V Tran
*Assistant Examiner* — Sreeya Sreevatsa
(74) *Attorney, Agent, or Firm* — Kile Park Reed & Houtteman PLLC

(57) ABSTRACT

The DC interrupting device includes a main current conduction unit including a main interrupting switch, which is a mechanical switch, a reverse current power supply unit connected to an input terminal of the main current conduction unit and configured to generate a predetermined reverse current, and a reverse current conduction unit configured to supply the reverse current to an output terminal of the main current conduction unit. The reverse current power supply (Continued)

unit includes a first reverse current dedicated capacitor charged by a voltage applied to an input terminal of the main current conduction unit, a polarity reversing inductor configured to reverse a polarity of the first reverse current dedicated capacitor, and a reverse current power supply unit switch configured to perform circuit connection such that the polarity reversing inductor reverses the polarity of the first reverse current dedicated capacitor.

15 Claims, 10 Drawing Sheets

(51) Int. Cl.
  *H01H 33/666* (2006.01)
  *H02H 3/087* (2006.01)
(58) Field of Classification Search
  USPC .......................................................... 361/102
  See application file for complete search history.

(56) References Cited

FOREIGN PATENT DOCUMENTS

| KR | 10-2015-0078704 | 7/2015 |
| KR | 10-2016-0033438 | 3/2016 |
| KR | 10-2016-0122325 | 10/2016 |
| KR | 10-2016-0133782 | 11/2016 |

\* cited by examiner

INVERSE CURRENT INJECTION-TYPE DIRECT CURRENT BLOCKING DEVICE AND METHOD USING VACUUM GAP SWITCH

TECHNICAL FIELD

The present invention relates to a DC current interrupting device and method, and more particularly, to a DC current interrupting device and method for rapidly preventing a fault DC current in a DC current transmission system using a voltage type converter.

BACKGROUND ART

The DC current system, which uses a voltage type converter, continues to attract a lot of attention. However, since the magnitude of the fault current rapidly increases when a fault occurs in such a system, if rapid current interruption is not achieved, this becomes a serious problem for system reliability.

In order to perform a rapid current interruption, a method of using a semiconductor switching element instead of a conventional mechanical switch may be considered. However, semiconductor switching elements have larger power losses and difficulties in economical aspects according to system configuration so that recently, proposed is a hybrid type interrupting method using a mechanical switch and a semiconductor switch together On the other hand, development tendency of DC interrupting technology for high voltage direct current (HVDC) can be roughly classified into two types. In relation to the first method, the DC current interruption is handled by the semiconductor switch and the mechanical switch is responsible for the transient voltage to be applied after the interruption, and the current and voltage characteristics required for a DC interrupter are separated and performed In relation to the second method, it is a method of injecting a reverse current to a mechanical interrupter to generate a current zero required for DC current interruption using a mechanical interrupter, and is a method of applying a semiconductor element to a reverse current generation For this, so far, active power semiconductors such as thyristors have been used in circuits for applying reverse current. However, in relation to the use of such active power semiconductor elements in the high voltage unit, the installation of the power source and the signal line according to the necessity of the gate signal makes the construction of the DC interrupter difficult.

DISCLOSURE OF THE INVENTION

Technical Problem

The present invention is suggested to solve the above-mentioned conventional problem and it is an object of the present invention to provide a DC interrupting device and method, which are simpler and robust in terms of signal control and system insulation without using active power semiconductor elements in the high voltage unit and have a comparative advantage in terms of cost.

Technical Solution

It is an object of the present invention to provide a DC interrupting device and method, which are simpler and robust in terms of signal control and system insulation without using active power semiconductor elements in the high voltage unit and have a comparative advantage in terms of cost.

According to the present invention to achieve the purpose, a DC interrupting device includes a main current conduction unit including a main interrupting switch, which is a mechanical switch, a reverse current power supply unit connected to an input terminal of the main current conduction unit and configured to generate a predetermined reverse current, and a reverse current conduction unit configured to supply the reverse current to an output terminal of the main current conduction unit The reverse current power supply unit includes a first reverse current dedicated capacitor charged by a voltage applied to an input terminal of the main current conduction unit, a polarity reversing inductor configured to reverse a polarity of the first reverse current dedicated capacitor, and a reverse current power supply unit switch configured to perform circuit connection such that the polarity reversing inductor reverses the polarity of the first reverse current dedicated capacitor.

According to such a configuration, the present invention provides a DC interrupting device and method, which is simpler and robust in terms of signal control and system insulation without using active power semiconductor elements in the high voltage unit and has a comparative advantage in terms of cost.

At this time, the reverse current may be a current discharged from the first reverse current dedicated capacitor in a polarity reverse state, and the reverse current conduction unit may include a first conduction unit switch for performing a circuit connection such that the reverse current is supplied to an output terminal of the main current conduction unit after the reverse current power supply unit switch is separated.

In addition, the reverse current power supply unit switch and the first conduction unit switch may be vacuum gap switches, and the reverse current power supply unit switch and the first conduction unit switch may be movable gap switches for controlling a current flow by a change in electrical distance between electrodes.

In addition, the reverse current power supply unit switch and the first conduction unit switch may set a connection time interval between the reverse current power supply unit switch and the first conduction unit switch according to a predetermined electrode moving speed and a distance between electrodes.

In addition, the reverse current power supply unit switch and the first conduction unit switch may include a fixing part where an electrode is located and a moving part for performing connection and separation between the electrodes. The reverse current power supply unit switch and the first conduction unit switch may be selectively connected according to moving of the moving part. At this time, the fixing part and the moving part may be connected at least at one contact point.

In addition, the reverse current power supply unit may further include a second reverse current dedicated capacitor symmetrically connected to the first reverse current dedicated capacitor with respect to the polarity reversing inductor and the reverse current power supply unit switch, and the reverse current conduction unit may further include a second conduction unit switch symmetrically connected to the first conduction unit switch with respect to the polarity reversing inductor and the main current conduction unit switch.

In addition, the device may further include a surge arrester for limiting a voltage of the first reverse current dedicated capacitor or the second reverse current dedicated capacitor.

In addition, the device may further include a current limiting inductor connected in series with the main interrupting switch between the main current conduction unit and the load input terminal.

In addition, the device may further include a capacitor charging switch in which one of two terminals is connected to each of the reverse current power supply unit and the reverse current conduction unit.

In addition, a DC interrupting method according to the present invention includes, by the DC interrupting device, when a current flowing in the main current conduction unit corresponds to a predetermined first interruption range, separating the main interrupting switch and reversing the polarity of the first reverse current dedicated capacitor by connecting the reverse current power supply unit switch, and connecting the first conduction unit switch at a predetermined time point to generate zero in a current flowing in the main interrupting switch and interrupting the current flowing through the main interrupting switch.

In addition, the predetermined time point may be a time point at which after the separation of the main interrupting switch, a gap of the main interrupting switch is set so that the main interrupting switch maintains the insulation from the voltage charged in the first reverse current dedicated capacitor.

In addition, the method may further include determining a direction of a current flowing in the main current conduction unit before the main interrupting switch is separated, determining a predetermined first interruption range or second interruption range according to the direction of the current, and connecting the second conduction unit switch if corresponding to the second interruption range.

In addition, the method may further include connecting the capacitor charging switch for load current interruption.

Advantageous Effects

According to the present invention, by applying diodes and vacuum gap switches instead of active power semiconductor switching elements such as IGBTs, IGCTs, or thyristors, which are used to interrupt DC current or apply reverse current in a conventional DC current interrupting method, it is possible to provide a DC current interrupting device and method which can simplify the insulation problem due to the power source and control signal line of the elements located in the high voltage unit and can be competitive in terms of cost.

MODE FOR CARRYING OUT THE INVENTION

Hereinafter, preferred embodiments of the present invention will be described with reference to the accompanying drawings.

Figure 1:
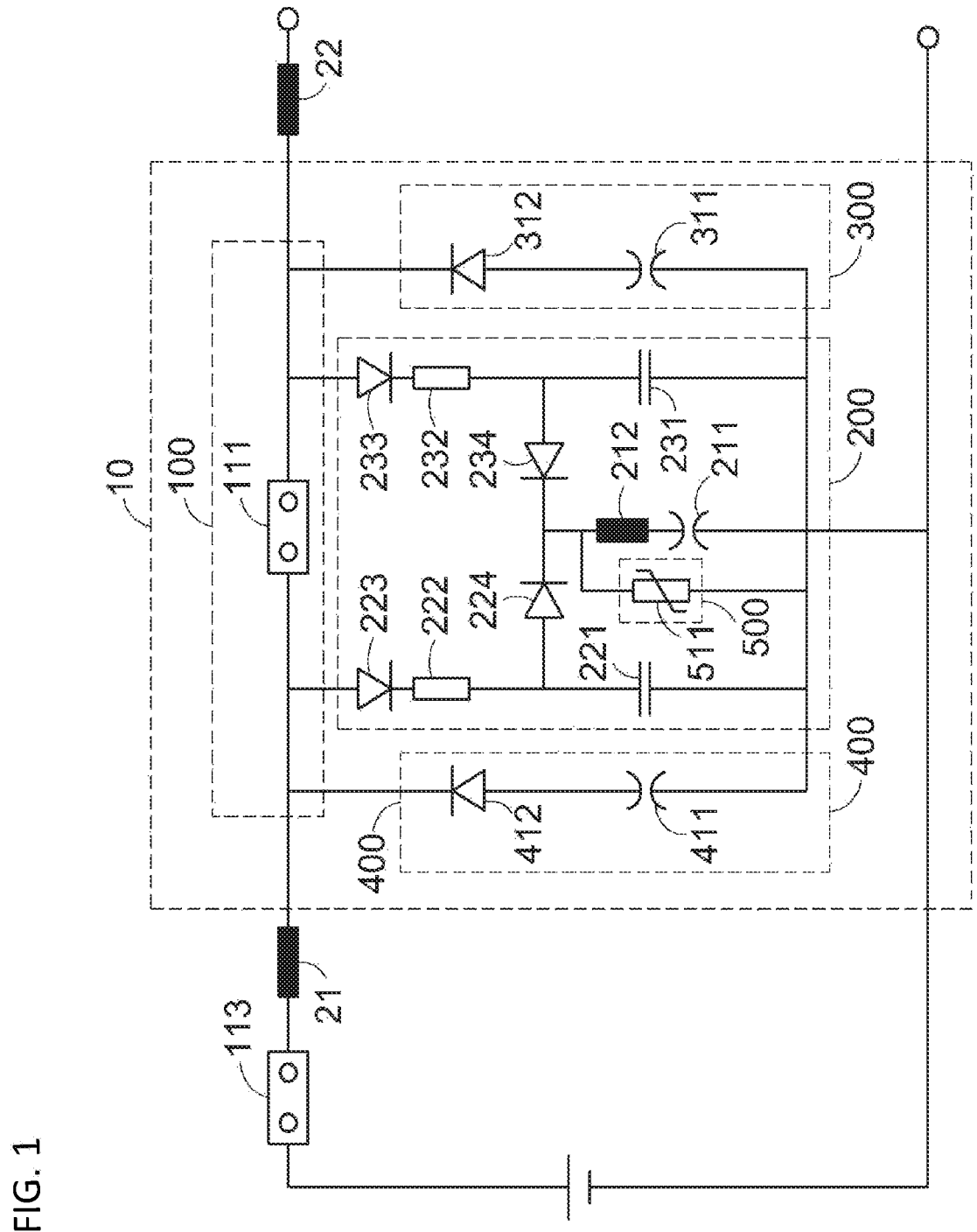
FIG. 1 is a schematic circuit diagram of a DC interrupting device according to an embodiment of the present invention

FIG. 1 is a schematic circuit diagram of a DC interrupting device according to an embodiment of the present invention. FIG. 1 shows a circuit diagram constituting a bidirectional DC current interrupting device. In FIG. 1, the DC interrupting device 10 includes a main current conduction unit 100, a reverse current power supply unit 200, reverse current conduction units 300 and 400, and a surge arrester 511, as a circuit in which a current flows in a typical normal state.

In the case of unidirectional DC current interrupters, except for the inductor 212 and the vacuum gap switch 211 at the center part, which are commonly used in one circuit of the two reverse current conduction units 300 and 400 and the reverse current power supply unit 200 having a symmetric shape, it is possible to omit one side of the circuits on both sides based on this.

The main current conduction unit 100 includes a main interruption dedicated high-speed mechanical switch 111 connected to current limiting inductors 21 and 22 in series with a DC interrupter. The reverse current power supply unit 200 and the reverse current conduction units 300 and 400 operate respectively based on the direction of an interruption current at both ends of the main interruption dedicated high-speed switch 111. Immediately after the main interruption dedicated high-speed switch 111 interrupts DC current, the surge arrester 511 absorbs the line accumulation energy while being connected in parallel with the reverse current and transient voltage generating capacitors included in the reverse current power supply unit 200.

The reverse current power supply unit 200 includes reverse current and transient voltage generating capacitors 221 and 231 for generating a reverse current, a charging/discharging current limiting resistors 222 and 232 connected in series with each capacitor, and discharge preventing diodes 223 and 233, and is a configuration for reversing the charging voltage polarity of the reverse current and transient voltage generating capacitors 221 and 231. Polarity reversing diodes 224 and 234, an inductor 212, and a vacuum gap switch 211 are configured in series to be connected to each of the capacitors.

The reverse current conduction units 300 and 400 have a structure in which the diodes 312 and 412 and the vacuum gap switches 311 and 411 are connected in series, and during the discharge operation of the vacuum gap switches 311 and 411, connect the load-side inductor 22 of the DC interruption unit to allow the reverse current to be injected to have a stable magnitude such that the reverse current and transient voltage generating capacitors 221 and 231 of the reverse current power supply unit 200 are maintained at a predetermined voltage or higher.

When more specifically described, in a normal state, the main interruption unit 100 responsible for current commutating consists of only one high-speed mechanical switch 111, and is configured such that current limiting inductors 21 and 22 are connected in series to the input and output terminals of the DC current interrupting device Also, the reverse current power supply unit 200 and the reverse current conduction units 300 and 400, which operate for the DC current interruption according to the direction of the interruption current at both ends of the main interruption dedicated high-speed mechanical switch 111, are connected to the ground sides with a symmetric structure.

In relation to the reverse current power supply unit 200, based on a circuit connected in series with the inductor 212 and the gap switch 211 for reversing the voltage polarity of the reverse current and transient voltage generating capacitors 221 and 231, the four diodes 223, 224, 233 and 234 and the reverse current limiting resistors 222 and 232 are configured to be connected to a voltage charging capacitor operating in the bidirectional current direction.

And, two circuits, each operating according to the direction of a current to be interrupted, are connected to both ends of the main interruption dedicated high-speed mechanical switch as the reverse current conduction units 300 and 400, and include the diodes 312 and 412 and the vacuum gap switches 311 and 411.

In such a circuit, through sequential operations at an appropriate time point, (1) the reverse current power supply unit 200 operates as three types of circuits such as a capacitor charging circuit composed of the diodes 223 and 233, the resistors 222 and 232, and the capacitors 221 and 231, (2) a polarity reversing circuit composed of the capacitors 221 and 231, the diodes 224 and 234, the inductor 212, and the gap switch 211, and (3) a reverse current injection circuit composed of the capacitors 221 and 231, the vacuum gap switches 311 and 411, the diodes 312 and 412, the main interruption unit switch 111, the diodes 223 and 233, and the reverse current size control resistors 222 and 232, so that it provides a DC interruption operation.

In such a way, by using the diodes 224 and 234 and the vacuum gap switch 211 of the polarity reversing circuit to perform the role of the conventional thyristor, it is possible to solve the difficulties in applying the active power semiconductor element to the high voltage part In addition, in the structure of the bidirectional DC interrupting device, the reverse current dedicated capacitor for each current direction is used separately to allow the main interruption unit switch 111 to be commonly used for both bidirectional currents, so that the DC interrupting device can be simplified.

At this time, the vacuum gap switch 211 of the polarity reversing circuit and the vacuum gap switches 311 and 411 of the reverse current injection circuit are allowed to operate as the same gap trigger controller and thus, an injection operation time point difference between two vacuum gap switches is maintained constant by the specific delay time Td, such that it is possible to always generate a constant size reverse current Also, in order to prevent the charging voltage of the capacitors 221 and 231 whose polarity is reversed during the delay time Td from discharging due to a load side short circuit, an inductor can be installed on the load side of the DC interruption unit.

In the conventional scheme used to generate the reverse current in such a manner, by replacing the use of active power semiconductor elements and non-linear resistors with diodes and vacuum gap switches, it is possible to provide a DC interrupting device capable of generating a counter voltage for stable reverse current injection and DC current interruption.

In addition, the DC interrupting device can be implemented using three separate vacuum gap switches, and perform an interruption operation by operating two vacuum gap switches among them according to the current direction when the current is interrupted.

Figure 2:
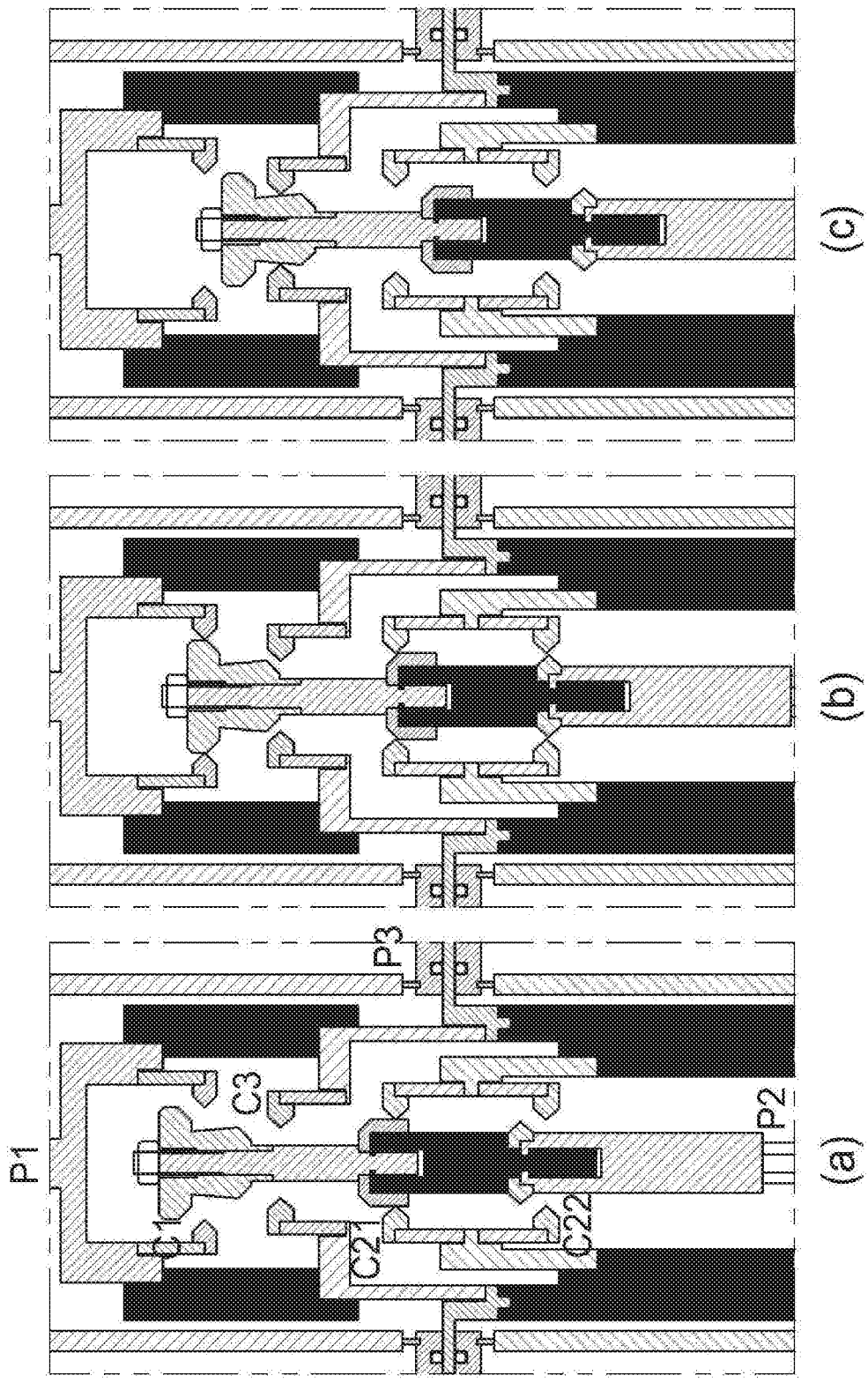
FIG. 2 is a diagram illustrating the configuration and operation process of a variable discharge gap switch.

Unlike this, a DC interrupting device may be implemented using a variable discharge gap instead of a vacuum gap switch. FIG. 2 is a diagram illustrating the configuration and operation process of a variable discharge gap switch In other words, instead of the vacuum gap switch used in the reverse current power supply unit 200 and the reverse current conduction unit 300 and 400, it can be operated as a movable gap switch, and the movable gap switch is operated as the same operator, and the injection time point time delay between the two switches can be determined according to the stroke speed and the distance.

In FIG. 2, the movable gap switch used consists of three internal contact points C1, C21, C22, and C3 between the fixing part and the moving part and three external connection terminals P1, P2, and P3 for external connection and the connection state between the external connection terminals is given by the mutual contact relation between the internal contact points, and during moving part operation, in order to prevent contact shocks of internal contact points, in the entire stroke area, an axis alignment support point of at least one point between the fixing part and the moving part is retained.

As shown in FIG. 2, when the variable discharge gaps 211, 311 and 411 operating in the reverse current generation step for forming the current zero are used, it shows that there are movable gaps C1, C2, C3 in which the three connection terminals P1, P2, and P3 externally and the moving part of the movable discharge gap internally travel downward to be contacted and separated. And, C2 is a series connection type of movable gap C21 and C22, so that it has a structure in which the insulation recovery performance of the gap can be enhanced In relation to the initial movable discharge gap connection state, the contact points C1 and C3 are separate and C2 is in a contact state so that the connection terminals P1, P2, and P3 are all separated, and when the moving part of the movable discharge gap is activated, as the moving part progresses in the downward stroke, the movable gap C1 is put in a state in which the movable gap C2 is still in contact, so that the external connection terminals P1 and P2 are in a close state And as the stroke continues, the movable gap C2 in which the gaps C21 and C22 are connected in series is separated and therefore, the external connection terminals P1 and P2 are again opened. Also, as the subsequent stroke progresses, a movable gap C3 is introduced and the external connection terminals P1 and P3 are closed together with the movable gap C1 maintaining the connection state until this point, and thereafter, the discharge gap C1 is separated according to the stroke and the external connection terminals P1 and P3 are opened and the stroke ends.

Figure 3:
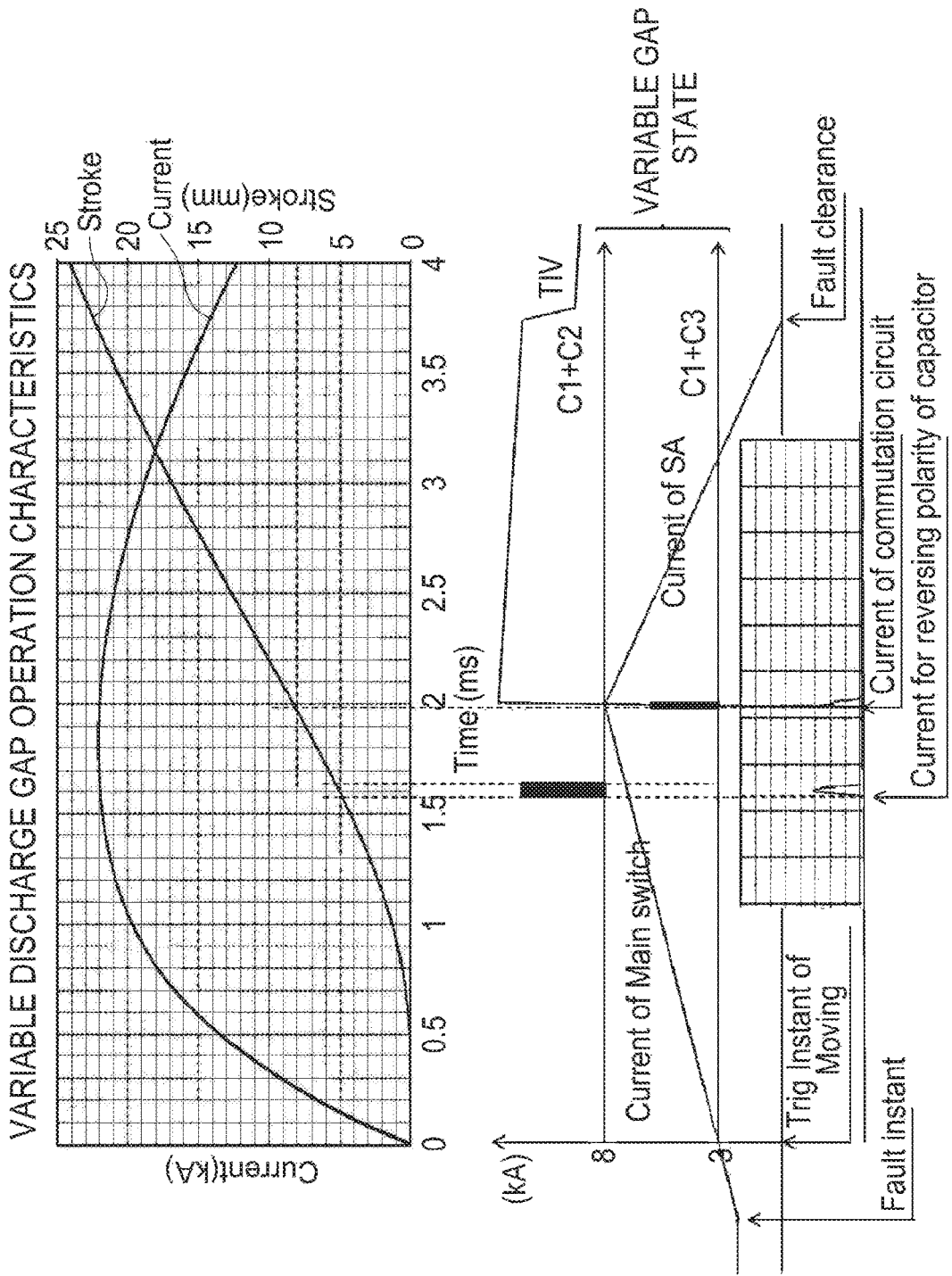
FIG. 3 is a diagram illustrating a relationship between a variable discharge gap operation and an interruption current in a DC current interruption process
Figure 4:
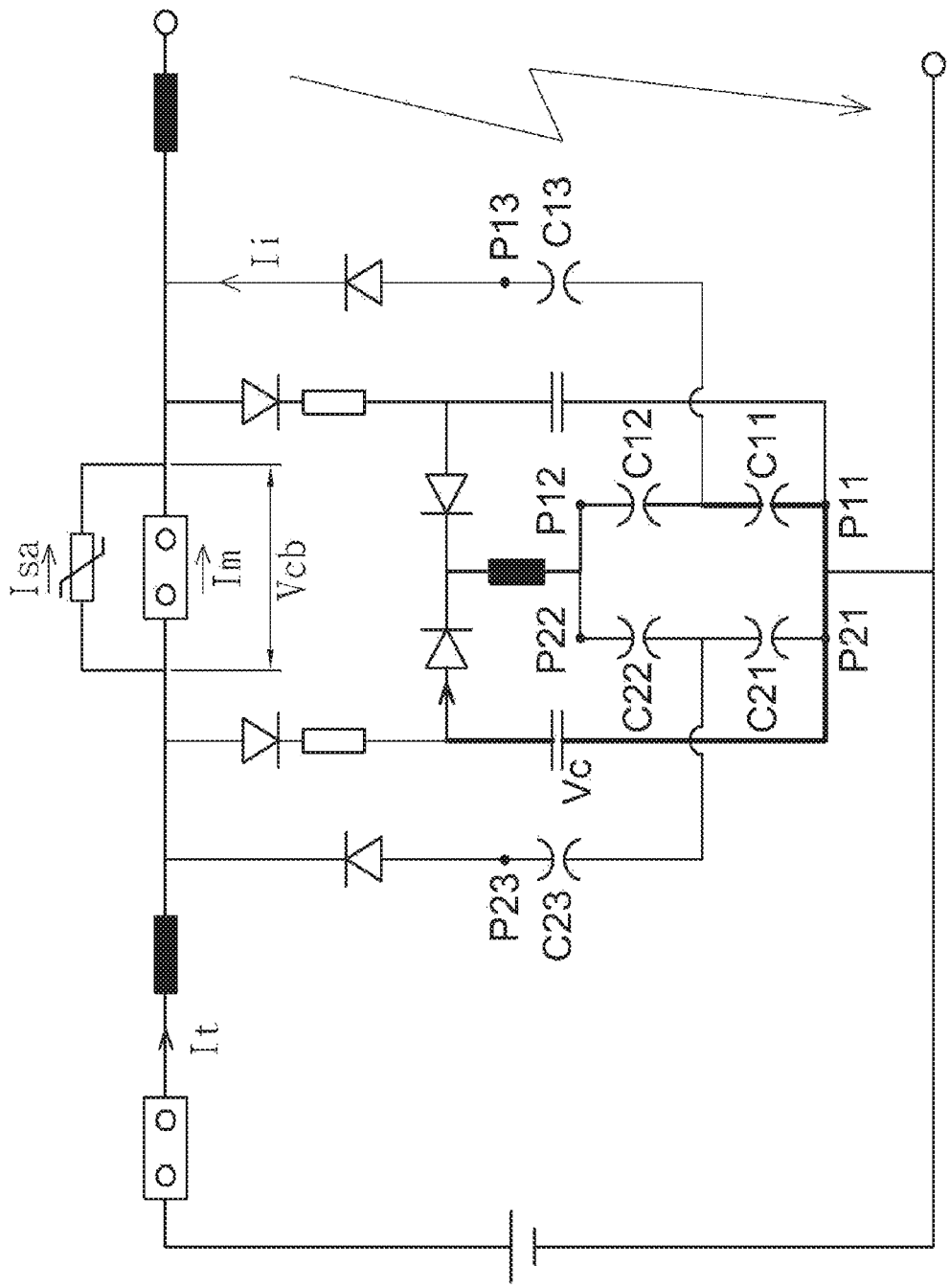
FIG. 4 is a diagram showing an example in which the variable discharge gap switch of FIG. 2 is installed in a DC current interrupting device.

FIG. 3 is a diagram illustrating a relationship between a variable discharge gap operation and an interruption current in a DC current interruption process. FIG. 3 shows the operation of the movable discharge gap in relation to the stroke characteristic and the interruption current flowing through the main interruption unit, and shows a state in which the states between the external terminals of the movable gap are sequentially opened again after input with a predetermined time interval A time point at which the last input indicated by 'C1+C3' occurs is a time point at which the current of the main interruption unit is interrupted by a reverse current and should be shorter than the interruption time specification of the DC current interrupting device. For example, in a DC current interrupting device with an interruption time of less than 2 ms, this time must be less than 2 ms in operation FIG. 4 is a diagram showing an example in which the variable discharge gap switch of FIG. 2 is installed in a DC current interrupting device. FIG. 4 shows an example in which the movable discharge gap is installed in a DC current interrupting device. In the case of a bidirectional interrupter, two movable discharge gaps are used.

When the current direction of the main interruption unit is the right side, the operating movable discharge gap is composed of the movable contact points C11, C12, and C13, and the external connection terminals are marked as P11, P12, and P13. On the other hand, when the current direction of the main interruption unit is the left side, the operating movable discharge gap is composed of the movable contact points C21, C22, and C23, and the external connection terminals are marked as P21, P22, and P23

As described above, in relation to the sequential connection state according to the stroke progression of the movable discharge gap, after the connection line between P11 and P12 becomes 'on' by close of C11 and C12, immediately, C12 is 'off' and C13 is 'on' so that the connection line between P11 and P12 is 'off' and the line connecting P11 and P13 is 'on'. And, if the current direction of the main interruption unit is opposite, the discharge gap installed symmetrically is sequentially operated in the same manner as described above.

Figure 5:
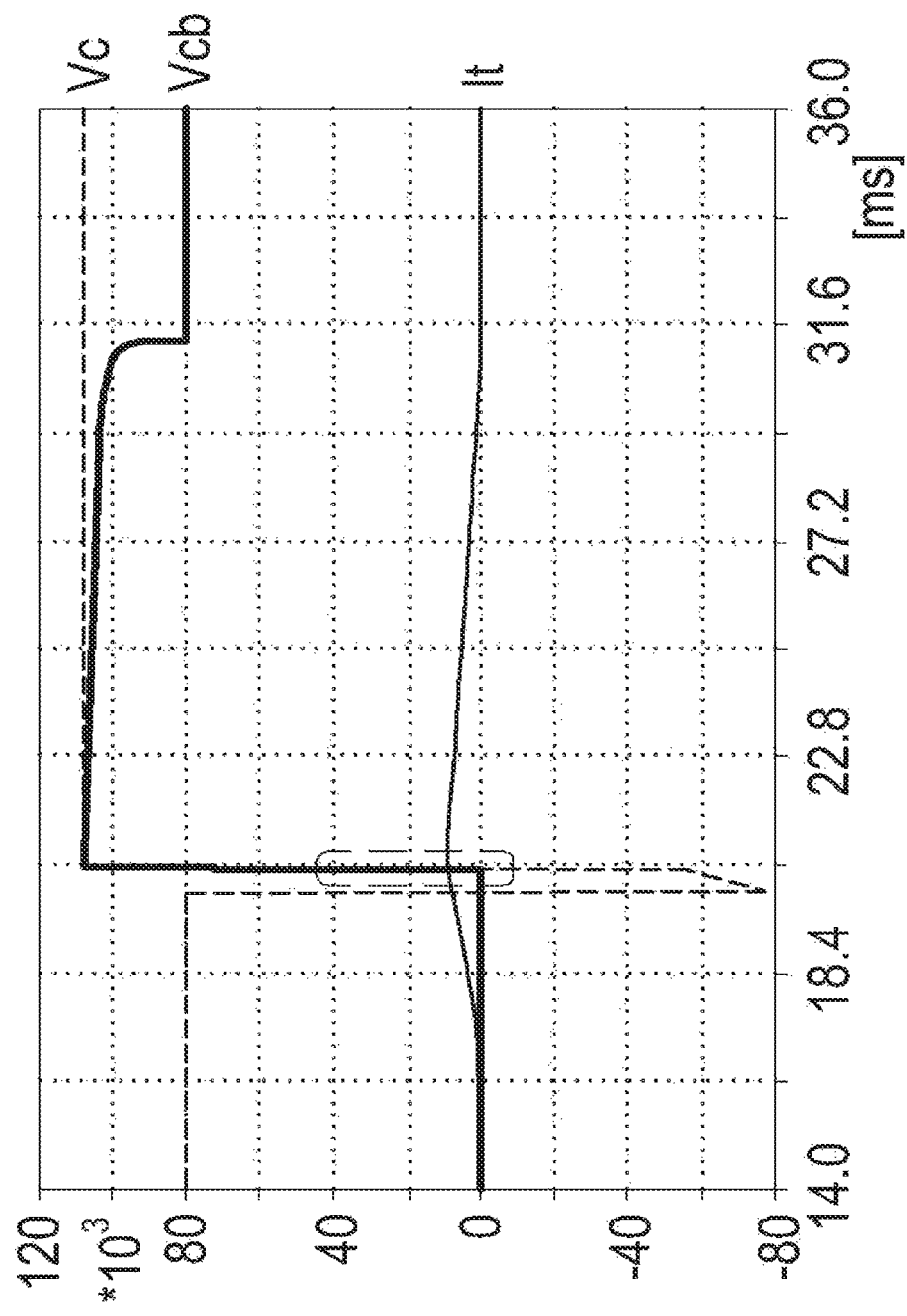
FIGS. 5 and 6 are diagrams showing voltages and waveforms when a DC current is interrupted.
Figure 6:
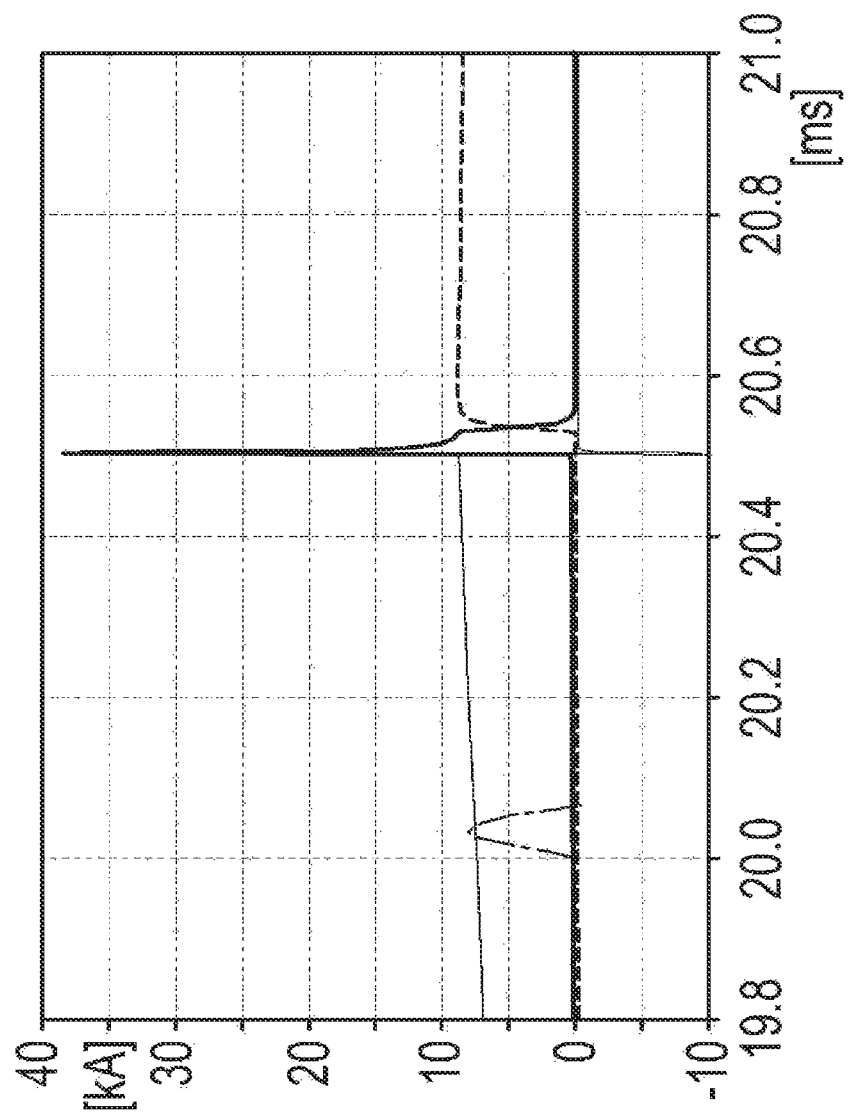

FIGS. 5 and 6 are diagrams showing voltage waveforms when the DC current is interrupted. FIG. 5 shows a main voltage signal when the DC current is interrupted, and FIG. 6 is an enlarged view of the polarity switching section of the voltage charging capacitor of FIG. 5.

In a state where the voltage Vc of the voltage charging capacitor is charged with the line voltage as undergoing an interruption operation process, after the blocking operation, the polarity is reversed and immediately is restored to its original polarity, and the size maintains a charging state with the residual voltage size of a surge arrester And, the voltage Vcb applied to both ends of the main interruption dedicated high-speed switch is the current zero generated by the reverse current application, and DC current is commutated using the commutation circuit, and the voltage appearing in the process of a DC current flowing through the voltage charging capacitor becomes a voltage form generated as commutated again using a surge arrester.

Figure 7:
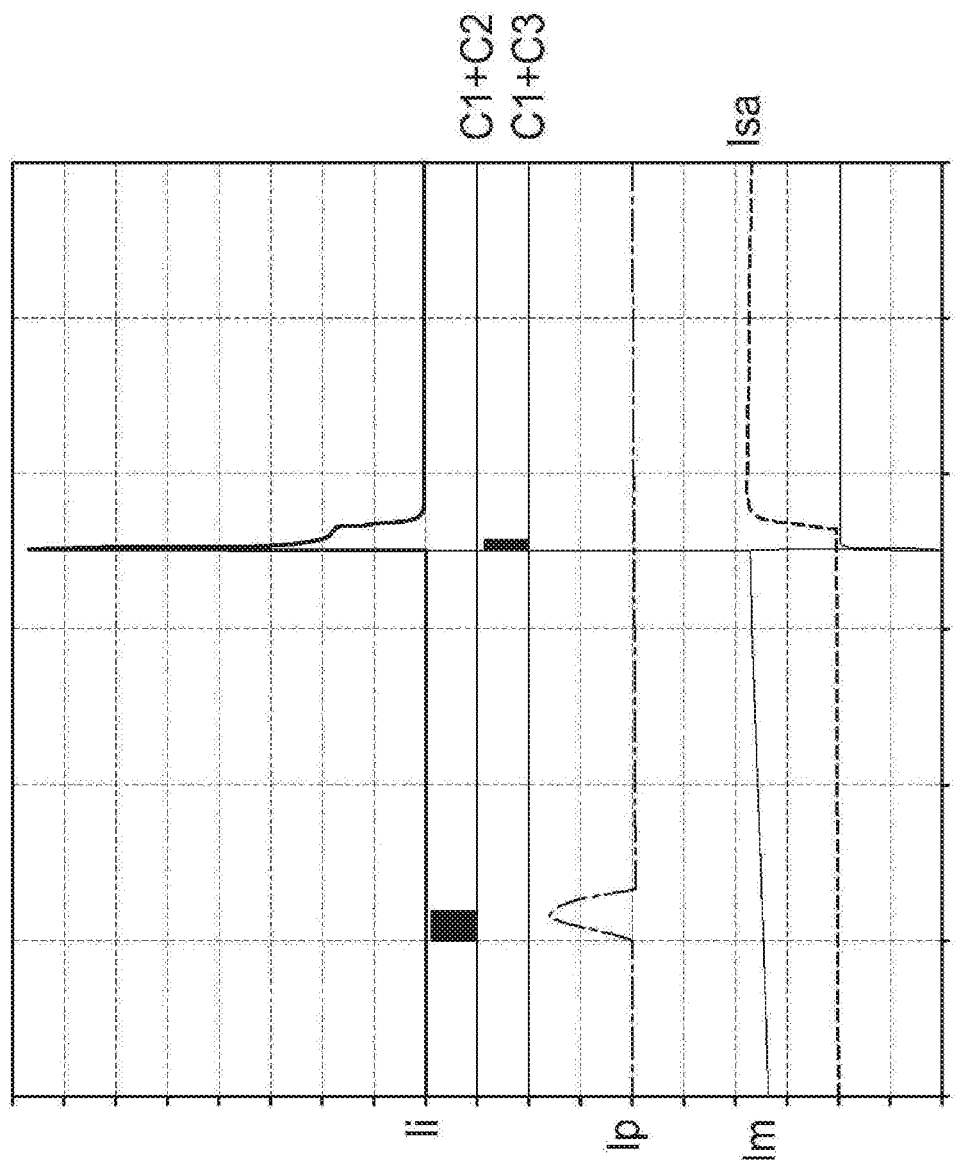
FIG. 7 is a diagram showing a current waveform when a DC current is interrupted.
Figure 8:
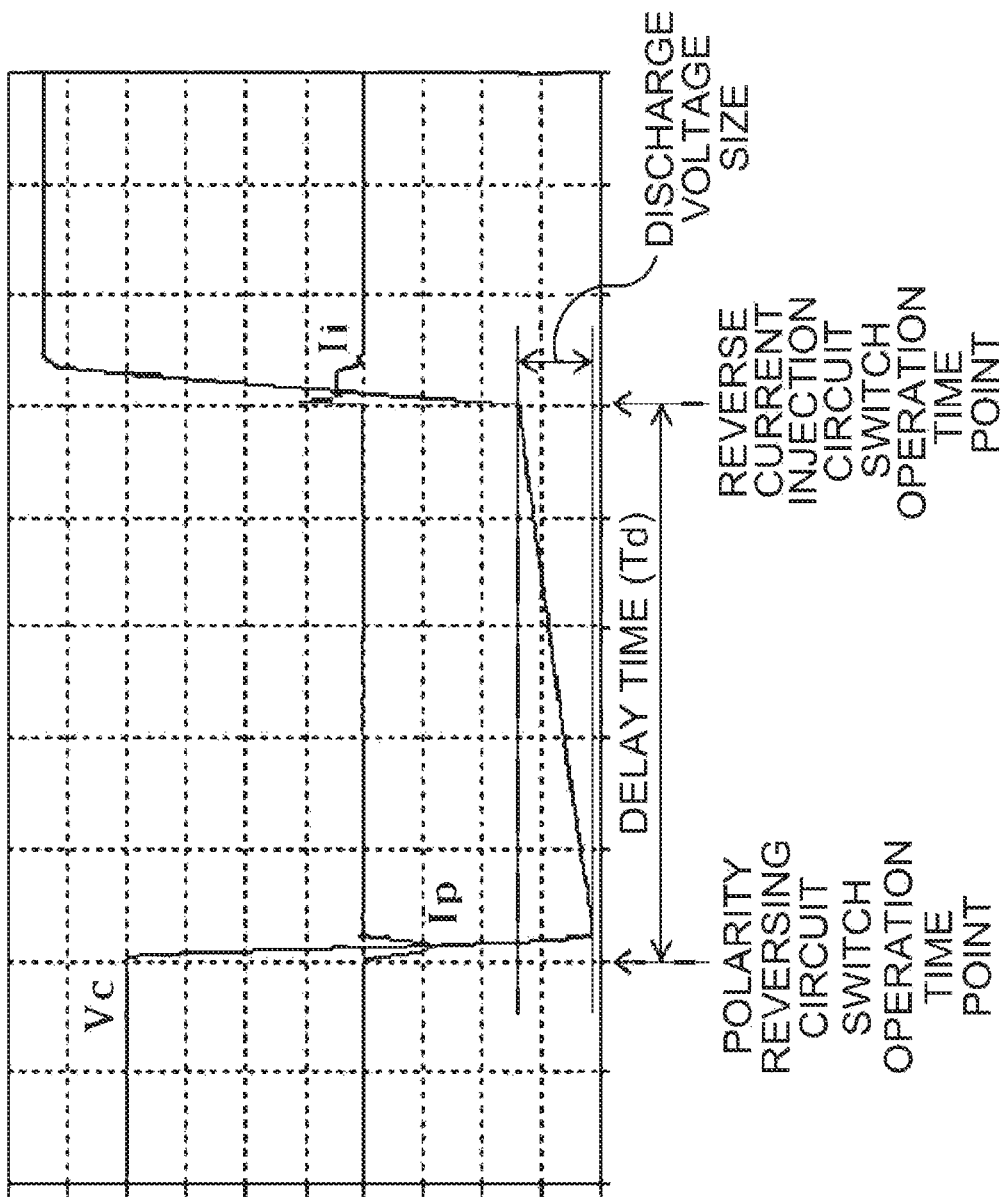
FIG. 8 is a diagram showing current waveforms and voltage of capacitors appearing according to the operation state of a movable discharge gap.

FIG. 7 is a diagram showing a current waveform when the DC current is interrupted, and FIG. 8 is a diagram showing the current waveforms and the voltage of a capacitor according to the operation state of a movable discharge gap. First, Ip is the current flowing in the polarity reversing circuit, and when the C1 and C2 of the movable discharge gap are 'on', the resonant current of the half wave appears, and due to this, the voltage charging capacitor is reversed in polarity and is ready to apply reverse current At the time point at which the C1 and C3 of the immediately appearing movable discharge gap is 'on', the reverse current Ii is generated, so that a current zero is generated in the main interruption dedicated high-speed switch and the current is interrupted, and the commutated interruption current becomes Ii, and this current causes the capacitor charging voltage to rise, and when it reaches the residual voltage value of the surge arrester, this current is again the surge arrester current Isa, and absorbs all residual energy of the line and reaches the DC current interruption There is a delay time Td between the operating time point of the polarity reversing switch and the operating time point of the switch for reverse current injection circuit, and during this period, since the charge voltage drops due to the discharge through the load-side inductor of the DC interruption unit, a voltage charged in a capacitor at the reverse current injecting switch operation time point should be greater than a predetermined voltage The predetermined voltage at this time is a voltage magnitude in which the magnitude of the reverse current given by the residual voltage Vc of the capacitor and the reverse current limiting resistors 222 and 232 is greater than the magnitude of the interruption current and the main interruption dedicated high-speed mechanical switch 111 generates a current zero Also, the capacitor charging circuits 500 and 600 at the occurrence of a fault current are added to the DC current interrupting device structure and therefore, it is possible to use the diodes 511 and 611, and has the capacitor charging switch 213 to operate by distinguishing the fault current interruption and the normal load current interruption.

Figure 9:
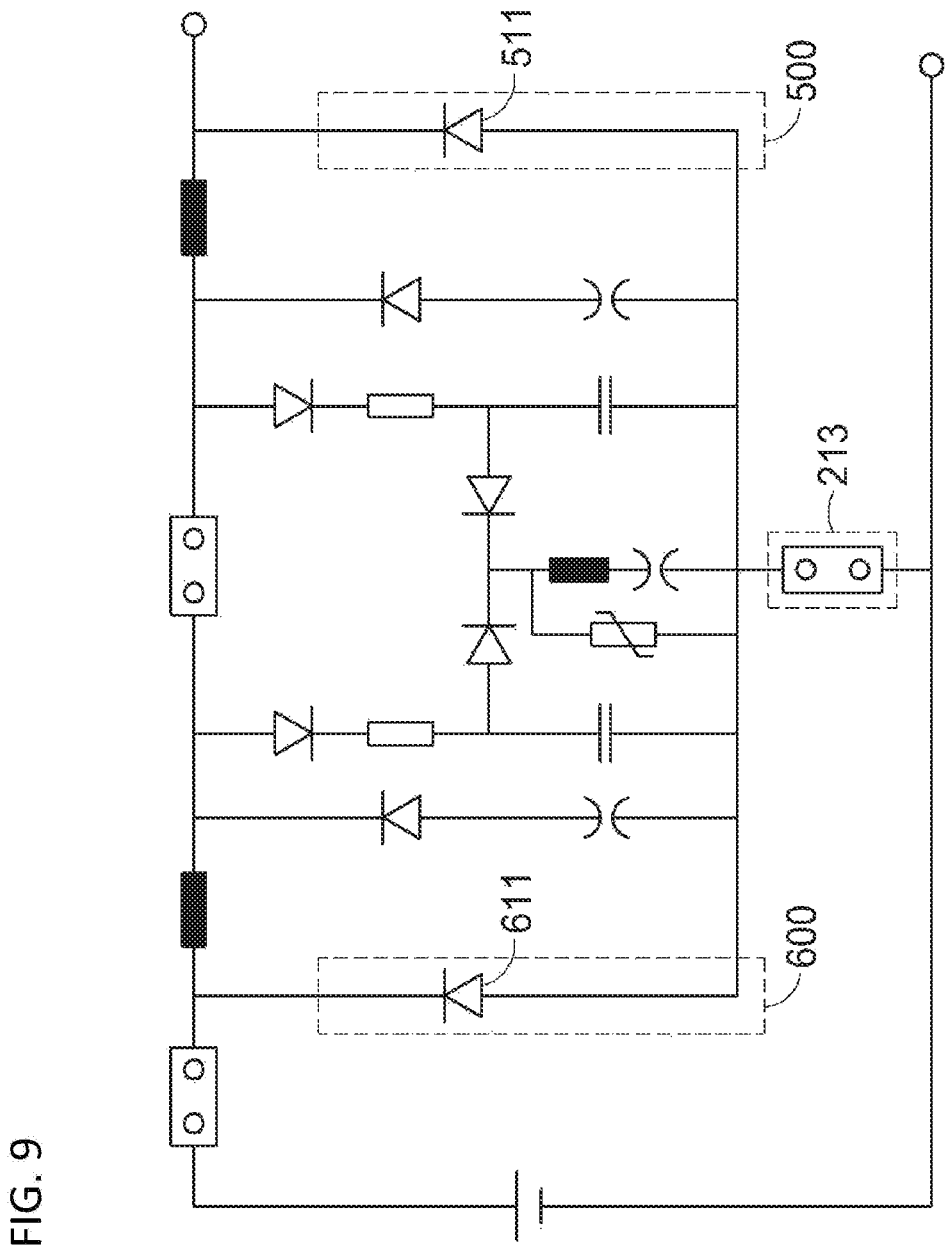
FIG. 9 is a circuit diagram of a DC interrupting device for charging a reverse current and transient voltage generating capacitor only during operation.

FIG. 9 is a circuit diagram of a DC interrupting device for charging a reverse current and transient voltage generating capacitor only during operation. In FIG. 9, the capacitors 221 and 231 of the DC current interrupting device are not charged normally, but are charged only when the interruption operation is required.

When fault current occurs, charging diodes 511 and 611 are provided to charge the capacitor using the voltage induced in the current limiting inductors 21 and 22 installed on both sides of the DC current interrupting device, and at the normal load current interruption, a capacitor charging switch 213 operated in an open state is put and used in normal conditions such that the line voltage can be used for charging the capacitor.

In other words, in normal conditions, it is not charged, but only when fault current occurs, the reverse current and transient voltage generating capacitors 221 and 231 are charged by the voltage generated on the line, or at the normal load current interruption, the capacitor charging switch 214, which is normally opened and operated, is put so as to charge the capacitor and to be interrupted.

Figure 10:
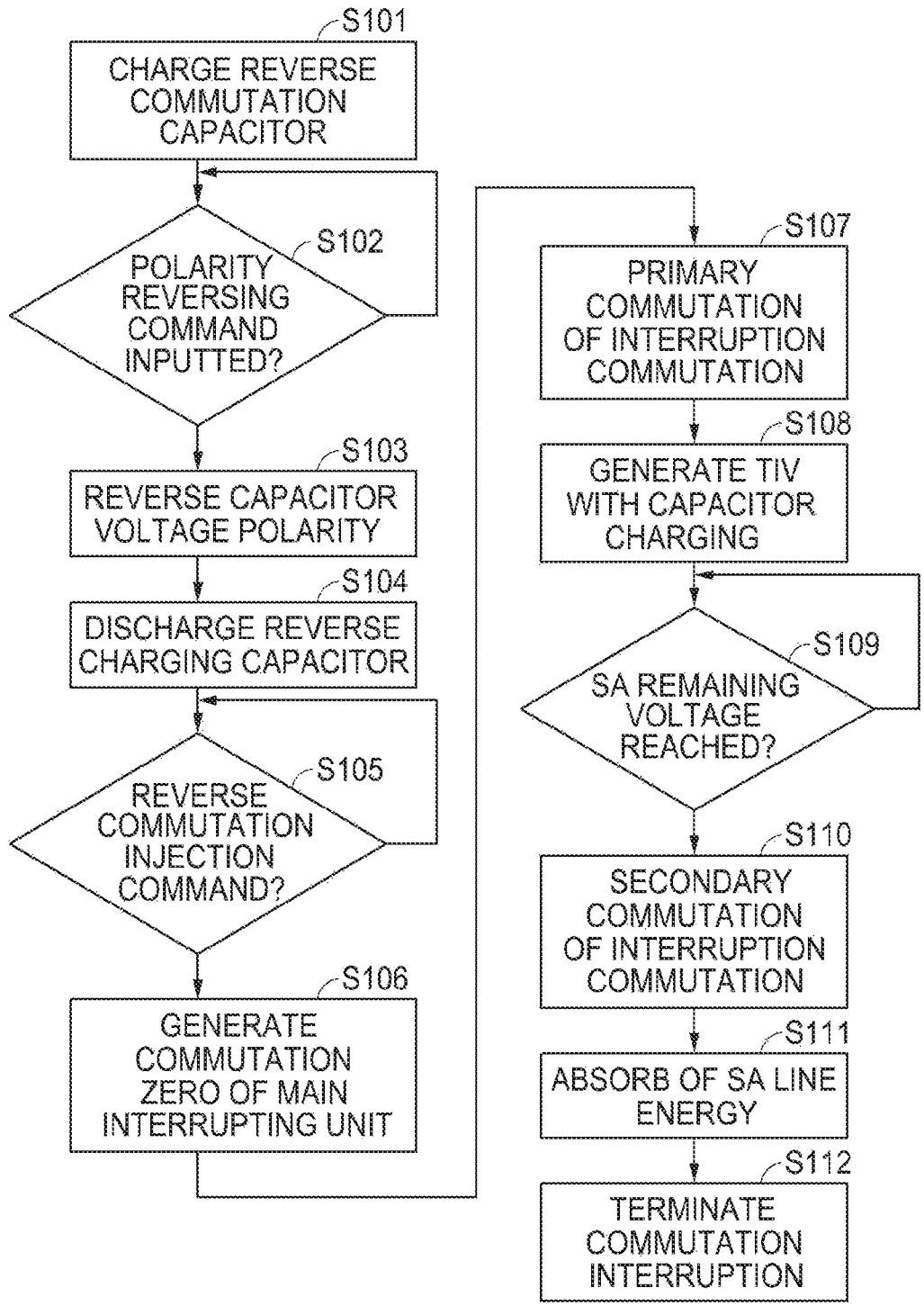
FIG. 10 is a schematic flowchart for performing a DC current interrupting method according to the present invention.

FIG. 10 is a schematic flowchart for performing a DC current interrupting method according to the present invention. FIG. 10 is a flowchart illustrating the operation of the DC current interrupting device, and schematically illustrates the DC current interrupting process of the DC interrupting device.

In relation to the process of DC current interruption, in the reverse current and transient voltage generating capacitors 221 and 231 of the reverse current power supply unit 200, the voltage is charged due to the line voltage (S101) and according to the polarity reversing command (S102), when the polarity is reversed by operation of the vacuum gap switch 211 (S103), the polarity-reversed capacitor voltage begins to discharge itself through the load-side inductor of the DC interrupter (S104).

The vacuum gap switches 311 and 411 of the reverse current conduction units 300 and 400 are operated immediately before this capacitor voltage is discharged to a predetermined voltage or lower (S105), and the a current flows to the main interruption Dedicated high-speed switch 111 in the direction opposite to interruption current to artificially form the current zero, which is the sum of interruption current and reverse current, such that the current of the main interruption unit 100 is interrupted (S107)

At this time, the vacuum gap switches 311 and 411 are selectively operated, and depending on the direction of the interruption current in the main interruption unit 100, only one of two vacuum gap switches is operated. That is, if the interruption current direction of the main interruption unit flows to the right, the vacuum gap switch 311 on the right side is operated, and conversely, if flowing to the left, the vacuum gap switch 411 on the left side is operated to interrupt the DC current.

In such a manner, the time point at which the current is interrupted by the high-speed mechanical switch 111 needs to be adjusted to the time point at which it becomes a gap distance that the high-speed mechanical switch 111 is capable of sufficiently maintaining the insulation from the transient voltage generated after the current interruption and when the current is interrupted at the high-speed mechanical switch 111 of the main interruption unit, the interruption current is commutated by a commutation circuit through the reverse current and transient voltage generating capacitors 221 and 231 and the charging voltage of the capacitor is generated as a transient voltage (S108)

When the transient voltage at this time becomes equal to or higher than a predetermined voltage (S109), it is limited due to the surge arrester 511 connected in parallel with the reverse current and transient voltage generating capacitor, a secondary current (commutation) is generated (S110), and the energy stored in the line is absorbed through the surge arrester 511 (S111), and the current is reduced, and the interruption is finally completed (S112) at the time of the current zero generated subsequently.

Again, in the DC current interrupting device of FIG. 1, it includes a) determining the magnitude and direction of the current flowing in the main current conduction unit 100, (b) reversing the charging voltage polarity of the reverse current and transient voltage generating capacitor through the opening operation of the main interruption dedicated high-speed switch 111 and the inputting of the voltage polarity reversing mechanical switch 211 according to the given operation command, c) selecting the reverse current commutating mechanical switches 311 and 411 according to the current direction of the main current conduction unit 100, and when the gap of the main interruption dedicated high-speed switch 111 becomes a distance enough to withstand the transient voltage generated after current interruption, putting it and generating zero in the current flowing in the main interruption dedicated high-speed switch 111 to interrupt the current flow.

Accordingly, d) the current interrupted in the main interruption unit 100 flows through a commutation circuit formed by the reverse current and transient voltage generating capacitors 221 and 231, and if the voltage on the voltage charging capacitor rises above a predetermined voltage, it is again commutated to the side of the surge arrester 510 used for absorbing the line energy such that the current is interrupted due to the reverse voltage generated at this time.

At this time, when the current flowing in the main current conduction unit 100 is in the right direction, the right reverse current commutating vacuum gap switch 311 is put and commutates the discharging current of the left reverse current and transient voltage generating capacitor 221 by the main interruption dedicated high-speed switch 111, and if the direction of the current is the left direction, the left reverse current commutating vacuum gap switch 411 is put and commutates the discharging current of the right reverse current and transient voltage generating capacitor 231 by the main interruption dedicated high-speed switch 111 such that the current zero is generated at the main interruption dedicated high-speed switch 111.

Also, in relation to the discharge operation of the polarity reversing vacuum gap switch 211 of the reverse current and transient voltage generating capacitors 221 and 231 and the vacuum gap switches 311 and 411 of the reverse current conduction unit, after the polarity is completely reversed by the polarity reversing circuit, in order to ensure a constant time interval so that the vacuum gap switch input of the reverse current conduction unit can be made, the delay operation between the two vacuum gap switches is maintained, and at the time of inputting the vacuum gap switches 311 and 411 for the reverse current injection, in order to have a proper discharge time constant for ensuring a constant residual voltage of the reverse current and transient voltage generating capacitors 221 and 231, the load-side inductor 22 of the DC interruption unit is used.

The present invention relates to a DC current interrupting device and method, and relates to a DC current interrupting device and method in which a fault DC current can be interrupted quickly in order to maintain system stability in the DC transmission system where a voltage type converter requiring a significantly faster fault current interruption time than the conventional current type converter system is required.

As a reverse current injection method, in order to artificially make the current interruption in the main interruption unit to perform the DC interruption, in previous methods of the same concept, active power semiconductor elements requiring gate signals such as thyristors are used in the high voltage unit to which the system voltage is applied such that power supply and signal lines for signal generation complicate the DC interrupting system.

The present invention is characterized in that a high-voltage part of a DC current interrupting device is constituted only by a passive element, thereby realizing a more economical and simple device configuration. That is, in order not to use the power supply unit and the signal lines, by using a diode that is a passive element and a vacuum gap switch in the high voltage unit, DC current interruption is performed.

According to the present invention, instead of active power semiconductor elements used in high voltage parts, by using passive element diodes and vacuum gap switches that do not require a gate control signal and thus a power supply, the configuration of the high voltage unit can be configured simply and reliably Such an effect becomes larger as the applied voltage increases, and it may be useful in the future for a multi-terminal HVDC transmission system to be super-high voltage.

Although the present invention is described by some preferred embodiments, the scope of the present invention should not be limited thereby, and it should have an effect on the modifications and improvements of the above-described embodiments supported by the claims.

The invention claimed is:

1. A DC interrupting device comprising:
a main current conduction unit including a main interrupting switch, which is a mechanical switch;
a reverse current power supply unit connected to an input terminal of the main current conduction unit and configured to generate a predetermined reverse current; and a reverse current conduction unit configured to supply the reverse current to an output terminal of the main current conduction unit, wherein the reverse current power supply unit comprises:

a first reverse current dedicated capacitor charged by a voltage applied to an input terminal of the main current conduction unit;

a polarity reversing inductor configured to reverse a polarity of the first reverse current dedicated capacitor; and a reverse current power supply unit switch configured to perform circuit connection such that the polarity reversing inductor reverses the polarity of the first reverse current dedicated capacitor, wherein the reverse current conduction unit comprises a first conduction unit switch for performing a circuit connection such that the reverse current is supplied to an output terminal of the main current conduction unit after the reverse current power supply unit switch is separated, wherein the reverse current power supply unit further comprises a second reverse current dedicated capacitor symmetrically connected to the first reverse current dedicated capacitor with respect to the polarity reversing inductor and the reverse current power supply unit switch, and wherein the reverse current conduction unit further comprises a second conduction unit switch symmetrically connected to the first conduction unit switch with respect to the polarity reversing inductor and the main interrupting switch.

2. The DC interrupting device of claim 1, wherein the reverse current is a current discharged from the first reverse current dedicated capacitor in a polarity reverse state.

3. The DC interrupting device of claim 2, wherein the reverse current power supply unit switch and the first conduction unit switch are vacuum gap switches.

4. The DC interrupting device of claim 3, wherein the reverse current power supply unit switch and the first conduction unit switch are movable gap switches for controlling a current flow by a change in electrical distance between electrodes.

5. The DC interrupting device of claim 4, wherein the reverse current power supply unit switch and the first conduction unit switch set a connection time interval between the reverse current power supply unit switch and the first conduction unit switch according to a predetermined electrode moving speed and a distance between electrodes.

6. The DC interrupting device of claim 5, wherein the reverse current power supply unit switch and the first conduction unit switch comprise a fixing part where an electrode is located and a moving part for performing connection and separation between the electrodes, wherein the reverse current power supply unit switch and the first conduction unit switch are selectively connected according to moving of the moving part.

7. The DC interrupting device of claim 6, wherein the fixing part and the moving part are connected at least at one contact point.

8. The DC interrupting device of claim 7, further comprising a surge arrester for limiting a voltage of the first reverse current dedicated capacitor or the second reverse current dedicated capacitor.

9. The DC interrupting device of claim 8, further comprising a current limiting inductor connected in series with the main interrupting switch between the main current conduction unit and the load input terminal.

10. The DC interrupting device of claim 9, further comprising a capacitor charging switch in which one of two terminals is connected to each of the reverse current power supply unit and the reverse current conduction unit.

11. The DC interrupting device of claim 10, further comprising a diode connected between the load input terminal and the terminal of the capacitor charging switch respectively connected to the reverse current power supply unit and the reverse current conduction unit.

12. A DC interrupting method comprising:

by the DC interrupting device of claim 1, when a current flowing in the main current conduction unit corresponds to a predetermined first interruption range, separating the main interrupting switch and reversing the polarity of the first reverse current dedicated capacitor by connecting the reverse current power supply unit switch; and connecting the first conduction unit switch at a predetermined time point to generate zero in a current flowing in the main interrupting switch and interrupting the current flowing through the main interrupting switch.

13. The method of claim 12, wherein the predetermined time point is a time point at which after the separation of the main interrupting switch, a gap of the main interrupting switch is set so that the main interrupting switch maintains the insulation from the voltage charged in the first reverse current dedicated capacitor.

14. The method of claim 13, wherein the reverse current power supply unit further comprises a second reverse current dedicated capacitor symmetrically connected to the first reverse current dedicated capacitor with respect to the polarity reversing inductor and the reverse current power supply unit switch, and the reverse current conduction unit further comprises a second conduction unit switch symmetrically connected to the first conduction unit switch with respect to the polarity reversing inductor and the main current conduction unit switch, further comprising:

determining a direction of a current flowing in the main current conduction unit before the main interrupting switch is separated;

determining a predetermined first interruption range or second interruption range according to the direction of the current; and connecting the second conduction unit switch if corresponding to the second interruption range.

15. The method of claim 14, wherein the DC interrupting device further comprises a capacitor charging switch in which one of two terminals is connected to each of the reverse current power supply unit and the reverse current conduction unit, further comprising connecting the capacitor charging switch for load current interruption.

* * * * *